(12) United States Patent
Miura et al.

(10) Patent No.: US 6,359,359 B1
(45) Date of Patent: Mar. 19, 2002

(54) PERMANENT MAGNET MOTOR

(75) Inventors: Tetsuya Miura, Nishikamo-gun; Masaru Hirako, Inazawa; Shigetaka Nagamatsu, Nissin; Yasutomo Kawabata, Aichi-gun; Tetsuya Sugimoto, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/439,670

(22) Filed: Nov. 15, 1999

(30) Foreign Application Priority Data

Dec. 1, 1998 (JP) .......................... 10-342023
Mar. 24, 1999 (JP) .......................... 11-079803

(51) Int. Cl.⁷ .......................... H02K 21/12; H02K 1/22
(52) U.S. Cl. .......................... 310/156.43; 310/156.08; 310/262
(58) Field of Search .......................... 310/156, 152, 310/262, 261, 156.23, 156.25, 156.43, 156.74, 156.75, 156.08, 156.38

(56) References Cited

U.S. PATENT DOCUMENTS

| | | | | |
|---|---|---|---|---|
| 4,139,790 A | * | 2/1979 | Steen .......................... | 310/156 |
| 4,417,167 A | * | 11/1983 | Ishii et al. .................. | 310/67 R |
| 4,922,152 A | * | 5/1990 | Gleghorn et al. ............ | 310/156 |
| 5,097,166 A | * | 3/1992 | Mikulic ....................... | 310/156 |
| 5,159,220 A | * | 10/1992 | Kliman ........................ | 310/156 |
| 5,929,547 A | * | 7/1999 | Kim ............................ | 310/156 |
| 6,031,311 A | * | 2/2000 | Lee ............................. | 310/156 |
| 6,225,724 B1 | * | 5/2001 | Toide et al. ................. | 310/216 |

FOREIGN PATENT DOCUMENTS

| | | | |
|---|---|---|---|
| JP | HEI 7-79536 | | 3/1995 |
| JP | 407284238 A | * | 10/1995 |
| JP | HEI 8-163801 | | 6/1996 |
| JP | HEI 8-251848 | | 9/1996 |
| JP | HEI 9-93895 | | 4/1997 |
| JP | HEI 9-205745 | | 8/1997 |
| JP | HEI 9-308195 | | 11/1997 |
| JP | 410023692 A | * | 1/1998 |
| JP | 10112946 A | * | 4/1998 |
| JP | 410262357 A | * | 8/1998 |

* cited by examiner

*Primary Examiner*—Nestor Ramirez
*Assistant Examiner*—Guillermo Perez
(74) *Attorney, Agent, or Firm*—Kenyon & Kenyon

(57) ABSTRACT

A rotor piece has a plurality of holes 12. Each hole holds therein a plurality of substantially divided permanent magnets 14 that are arranged in a circumferential direction. Therefore, each permanent magnet is small and the flow passage of eddy currents becomes narrow, so that the magnitude of eddy currents becomes small. The total eddy currents in all the permanent magnets is also reduced, so that the eddy current loss can be reduced and the heat generation of the motor can be reduced. Adjacent ones of the substantially divided permanent magnets may be interconnected at portions thereof. One or more of the substantially divided permanent magnets 14 in one or more holes may be ferrite magnets, with other permanent magnets being rare-earth magnets.

4 Claims, 6 Drawing Sheets

PERMANENT MAGNET MOTOR

INCORPORATION BY REFERENCE

The disclosures of Japanese Patent Application Nos. HEI 10-342023 filed on Dec. 1, 1998 and HEI 11-79803 filed on Mar. 24, 1999 including the specification, drawings and abstract are incorporated herein by reference in their entirety.

BACKGROUND OF THE INVENTION

1. Field of the Invention

The present invention relates to a permanent magnet motor in which a rotor has a plurality of holes in which permanent magnets are disposed.

2. Description of the Related Art

In conventional permanent magnet motors, a plurality of permanent magnets are inserted and arranged in a rotor so that magnetic poles are formed. The rotor is driven by electrifying stator-side coils that are disposed substantially around the rotor and thereby forming rotating magnetic fields. Due to the permanent magnets, fields are formed individually for the predetermined poles, so that the motor size can be reduced and the motor output can be increased.

However, along with the pursuit for smaller sizes and faster operating speeds and higher outputs in motors, the problems of loss and heat generation due to eddy currents in the magnets become significant. Heat generation in a motor leads to demagnetization of the magnets, and may result in a failure of the motor. The losses caused by eddy currents reduce the motor efficiency.

SUMMARY OF THE INVENTION

Accordingly, it is an object of the present invention to provide a permanent magnet motor that reduces the loss and heat generation caused by eddy currents.

In accordance with one aspect of the invention, a permanent magnet motor includes a stator, and a rotor rotatably mounted in the stator. The rotor has a plurality of holes with a permanent magnet disposed in at least one of the holes. The permanent magnet is substantially divided into a plurality of permanent magnets arranged in a direction of a circumference of the rotor.

In the permanent magnet motor of the invention, a plurality of substantially divided permanent magnets are arranged in a hole in a circumferential direction. The divided arrangement reduces the total length of the outer peripheries of all the permanent magnets. Since eddy currents flow along an outer peripheral portion of each permanent magnet, the divided magnet arrangement increases the length of flow passages of eddy currents, so that the magnitude of eddy currents in each permanent magnet is reduced and the magnitude of eddy currents in all the permanent magnets is also reduced. Consequently, this permanent magnet motor reduces the eddy current loss and the heat generation of the motor.

The above-described permanent magnet motor may further have a construction in which the permanent magnet disposed in a hole is substantially divided into at least three divided permanent magnets, wherein one of the at least three divided permanent magnets that is located substantially in a middle of the hole is disposed radially outwardly, in a direction of a radius of the rotor, of the divided permanent magnets located at opposite ends of the hole.

By shifting the divided permanent magnets radially as described above, the arrangement of the divided permanent magnets becomes similar to an arcuate magnet. Therefore, if inexpensive flat or square type permanent magnets are used and shifted as described above, the permanent magnet motor can be produced at low costs while the torque ripple is substantially reduced.

At least one of the substantially divided permanent magnets in a hole may be formed by a ferrite magnet, and at least another one of the substantially divided permanent magnets may be formed by a rare-earth magnet. Since ferrite has high electric resistance, substantially no eddy current will occur in the ferrite magnet. Although the magnetic force of ferrite magnets is relatively weak, the reduction of the total magnetic force produced by all the permanent magnets can be curbed since only some of the permanent magnets are ferrite magnets and other magnets are rare-earth magnets.

Furthermore, a permanent magnet of the substantially divided permanent magnets that is located at a leading end of a hole with respect to a rotating direction of the rotor may be a ferrite magnet. Since the permanent magnet at the leading end of a hole enters a magnetic field produced by the stator, ahead of the other permanent magnets, the leading-end permanent magnet is more likely to experience greater eddy currents. However, placement of a ferrite magnet at the leading end position substantially eliminates eddy currents at that position, thereby enhancing the reduction of eddy currents.

In accordance another aspect of the invention, a permanent magnet motor includes a stator, and a rotor rotatable in the stator, the rotor having a plurality of holes. A permanent magnet is disposed in at least one of the holes. The permanent magnet is substantially divided into permanent magnet divisions by at least one slit in such a manner that adjacent ones of the permanent magnet divisions are interconnected at portions thereof.

Since the permanent magnet is substantially divided into permanent magnet divisions, eddy currents will be reduced. Furthermore, the permanent magnet divisions can be handled in the same manner as a single permanent magnet body. Therefore, this permanent magnet motor allows assembling operations and the like to be performed efficiently, and therefore improves the productivity.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
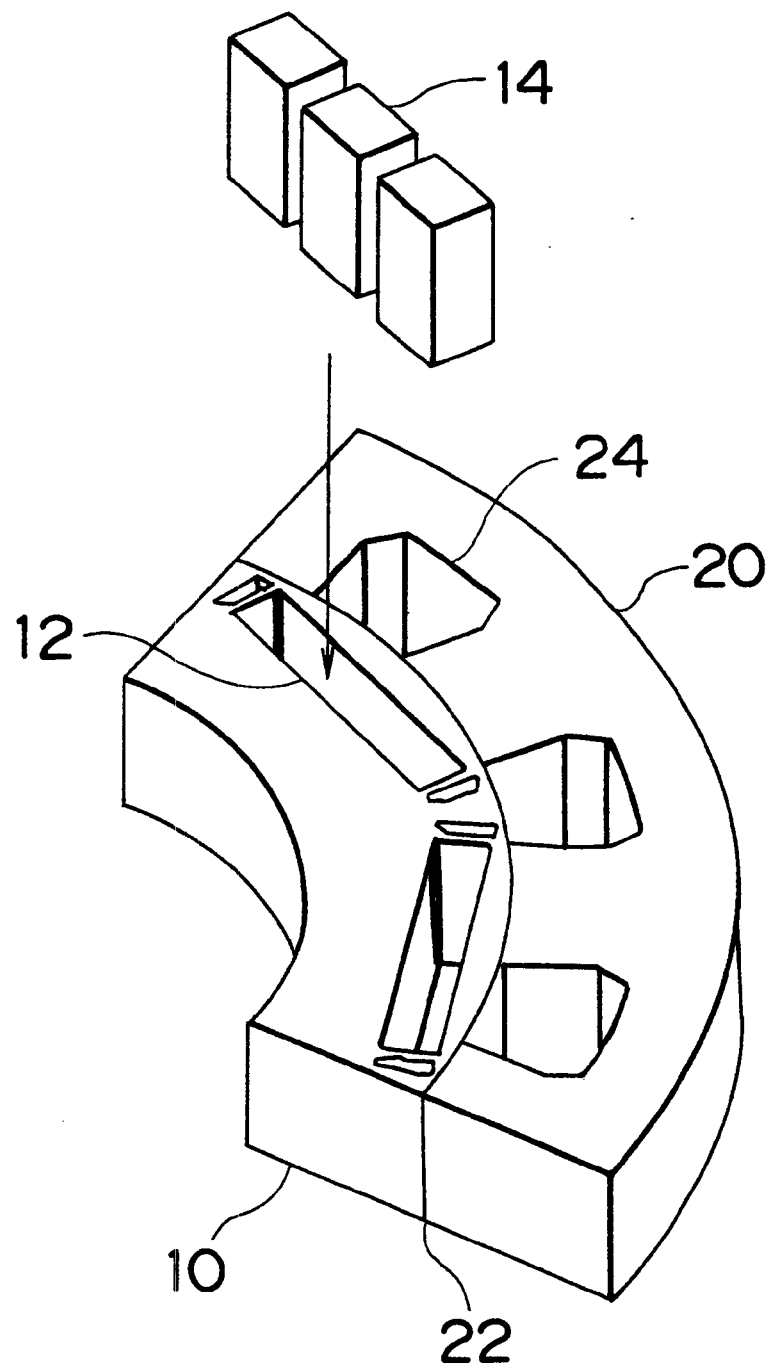
FIG. 1 illustrates the construction of a portion of a motor according to a first embodiment of the invention.

FIG. 1 illustrates the construction of a permanent magnet motor according to a first embodiment of the invention. FIG. 1 shows approximately one quarter of each of a rotor and a stator. A rotor piece 10, corresponding to a quarter of the rotor, has two holes 12. Each of the two holes 12 receives therein three permanent magnets 14 disposed contiguously in a circumferential direction.

The permanent magnets 14 are electrically separated from one another. The rear-permanent magnets 14 are mainly formed from iron, so that if placed in direct contact, the permanent magnets 14 become electrically connected. In this embodiment, an insulating material is disposed between the permanent magnets 14 to electrically separate the magnets 14 from one another. For example, an insulating paper, an insulating tape, or a synthetic resin such as an epoxy resin or the like, may be used as the insulating material disposed between the permanent magnets 14. The permanent magnets 14 may be entirely covered with an epoxy resin or the like so as to achieve not only insulation of the neighboring permanent magnets but also rust prevention.

A stator piece 20, corresponding to a quarter of the stator, is placed along a peripheral surface of the rotor piece 10, with a small gap 22 formed therebetween. The stator piece 20 has three holes 24. The three holes 24 receive therein stator coils (not shown).

Four rotor pieces 10 as described above are connected in a circumferential direction to form the rotor. A rotating shaft is disposed in a central portion of the rotor. The rotating shaft is fixed to the rotor. Four stator pieces 20 as described above are connected in a circumferential direction to form the stator.

Electrification of the stator coils is controlled to produce rotating fields. Since the permanent magnets 14 are disposed in the rotor, the rotating fields produce turning torques on the rotor, causing the rotor to rotate.

Figure 2A:
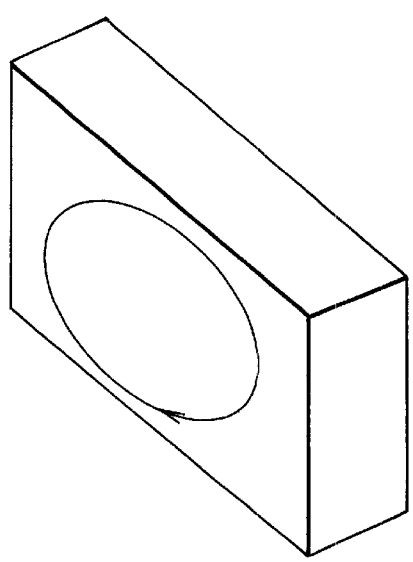
FIG. 2A illustrates a flow passage of eddy currents produced in a large permanent magnet.

The magnetic fluxes from the stator coils extend through the permanent magnets 14, causing eddy currents in the permanent magnets 14. If a single permanent magnet 14 were disposed in the hole 12, the permanent magnet 14 would be relatively large, causing eddy currents to flow in a wide passage extending substantially in the entire permanent magnet 14, as indicated in FIG. 2A.

Figure 2B:
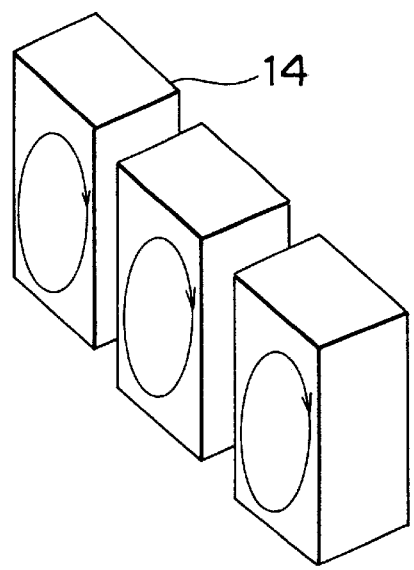
FIG. 2B illustrates flow passages of eddy currents produced in divided permanent magnets.

In this embodiment, however, a plurality of permanent magnets 14 are arranged in one hole 12 in a circumferential direction. Therefore, eddy currents flow along the outer periphery of each magnet as indicated in FIG. 2B. That is, if divided permanent magnets 14 are provided, the total length of the outer peripheries of the magnets increases and, therefore, the length of the passage of eddy currents increases. The magnitude of the eddy currents is correspondingly reduced. More specifically, the total magnitude of the eddy currents that occur in the three permanent magnets 14 disposed in a hole 12 is substantially less than the magnitude of the eddy currents that would occur in a single permanent magnet 14 disposed in the hole 12. Consequently, the eddy current loss and heat generation in the motor are reduced.

Figure 3:
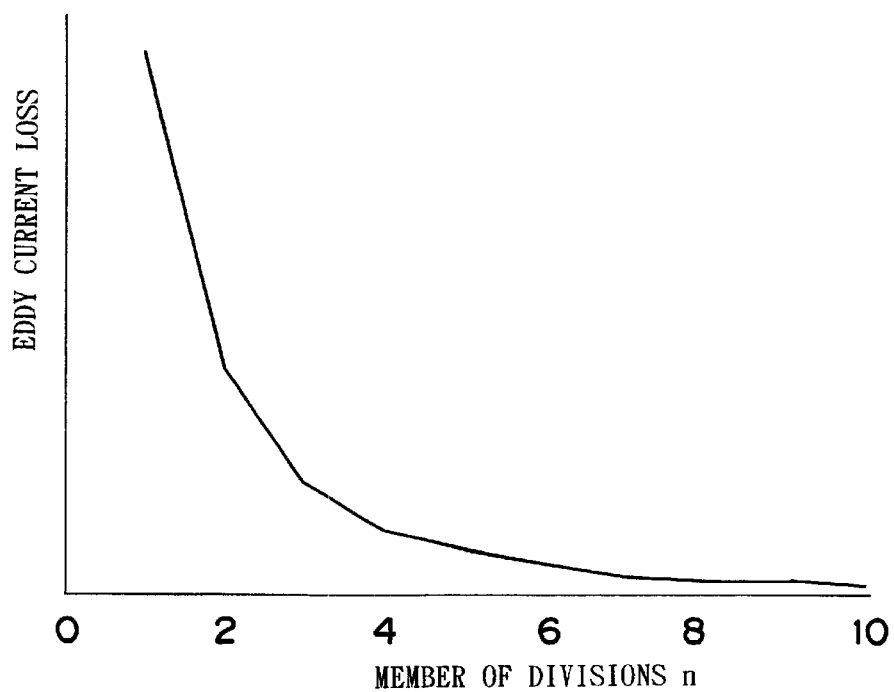
FIG. 3 is a diagram indicating a relationship between the number of divided permanent magnets and the eddy current loss.

FIG. 3 indicates a relationship between the number of divided permanent magnets 14 in a hole and the eddy current loss. As indicated in FIG. 3, as the number of divided permanent magnets 14 in a hole increases, the eddy current loss decreases. Placement of several divided permanent magnets in a hole considerably reduces the loss.

Figure 4:
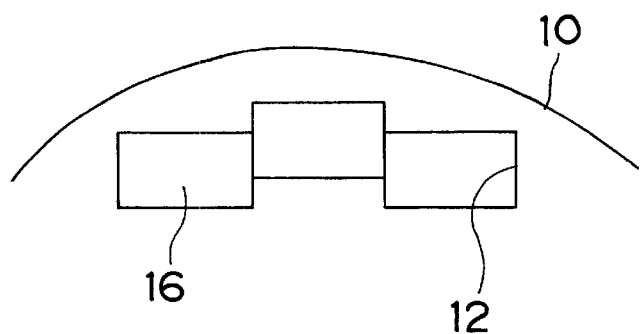
FIG. 4 illustrates the arrangement of permanent magnets according to a second embodiment of the invention.

FIG. 4 illustrates a construction according to a second embodiment of the invention, wherein a permanent magnet placed substantially in the middle of a hole 12 is disposed radially outwardly of the other permanent magnets 14 disposed in the hole 12, that is, shifted from the other permanent magnets 14 toward a stator. This arrangement reduces the torque ripple of the motor. It is preferred to dispose the divided permanent magnets 14 so that the volume centers of gravity of all the permanent magnets 14 are on the circumference of a single circle. It is a known technology to use permanent magnets curved in an arc shape extending along the periphery of a rotor. Although such a construction reduces the torque ripple, such arcuate permanent magnets are difficult to manufacture and poor in versatility, so that they become expensive. However, this embodiment uses flat plate type or square type permanent magnets 14, which are normally inexpensive. The flat plate type or square type permanent magnets 14 are shifted from one another in such a manner that the permanent magnets 14 are aligned in a direction of the circumference of the rotor. Therefore, the motor torque ripple can be sufficiently reduced, and the cost of the motor can be reduced.

Figure 5:
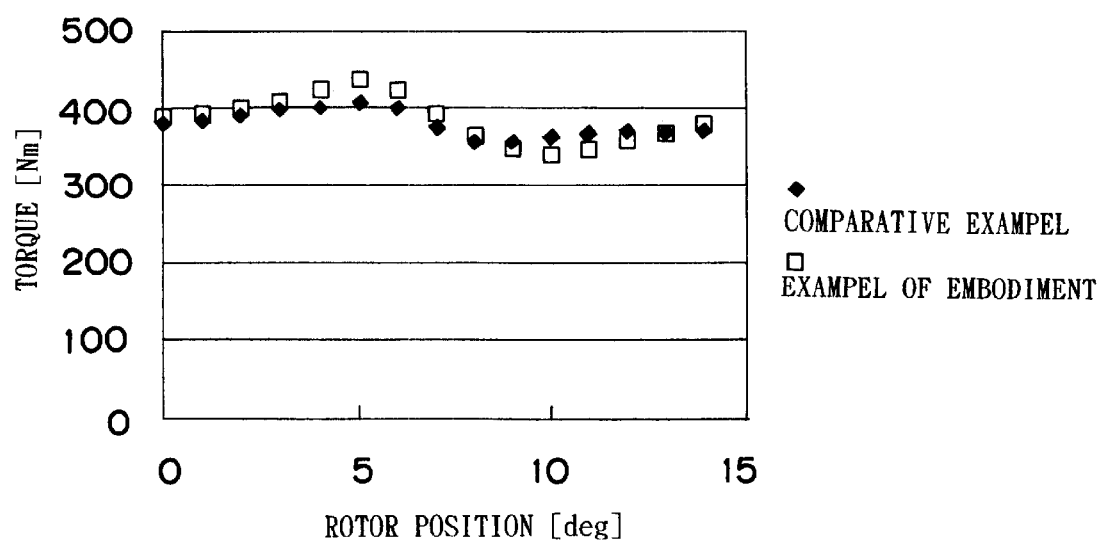
FIG. 5 is a diagram indicating a relationship between the arrangement of permanent magnets and the torque ripple.

FIG. 5 is a graph indicating the torque in accordance with the rotor position in an example according to the embodiment and a comparative example. In the example, three permanent magnets were disposed in each hole so that the volume centers of gravity of the permanent magnets were located on the circumference of a circle. In the comparative example, only one flat platy permanent magnet was disposed in each hole. Disposing three permanent magnets in each hole in place of one large permanent magnet and shifting the permanent magnet in the middle in each hole radially outward reduced the torque ripple from 25% to 13%.

Since a plurality of divided or smaller permanent magnets 14 are disposed in each hole 12, the construction of this example is also able to reduce the eddy current loss as mentioned above.

Figure 6:
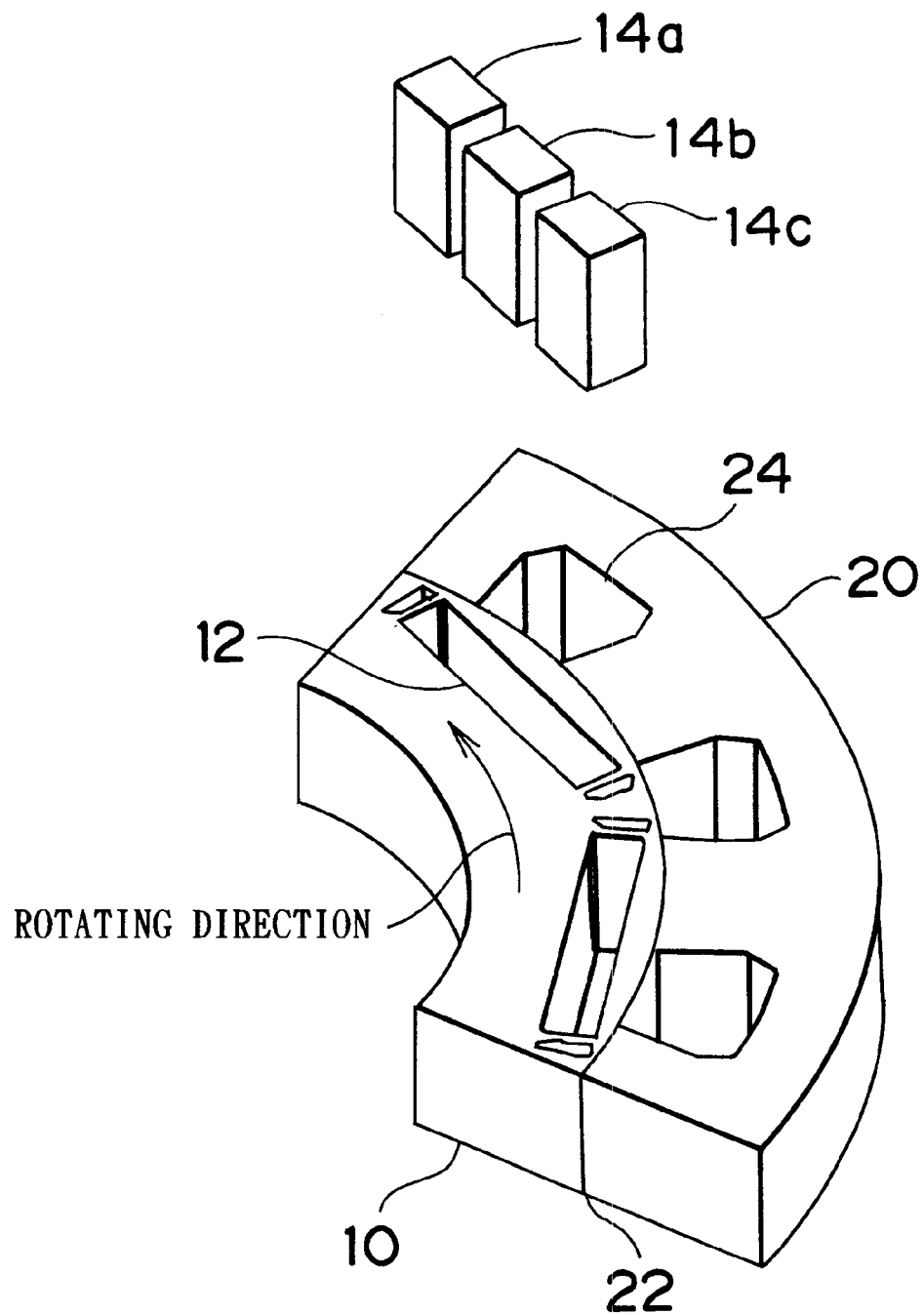
FIG. 6 illustrates the construction of a portion of a motor according to a third embodiment of the invention.

FIG. 6 illustrates a construction according to a third embodiment of the invention. In this embodiment, a rotor piece 10 is rotated counterclockwise as indicated by an arrow in FIG. 6. Divided or smaller permanent magnets 14a, 14b, 14c are inserted into a hole 12 of the rotor piece 10. The permanent magnets 14a, 14b, 14c are different in nature or property. More specifically, the permanent magnet 14a is a ferrite magnet whereas the permanent magnets 14b, 14c are rare-earth magnets.

The electric resistance of ferrite magnets is about 105–106 times the magnetic resistance of rare-earth magnets. Therefore, substantially no eddy current occurs in ferrite magnets. Consequently, the eddy current in each permanent magnet 14a in the embodiment is substantially zero.

The magnetic force of ferrite magnets is considerably weaker than that of rare-earth magnets. If all the permanent magnets inserted into the holes 12 of each rotor piece 10 of a rotor are ferrite magnets, the rotating force of the rotor becomes very weak. In the embodiment, however, one permanent magnet 14a of the three permanent magnets 14a–14c inserted into the hole 12 is a ferrite magnet and the other two permanent magnets 14b, 14c are rare-earth magnets. Therefore, the eddy current in one of the three permanent magnets 14a–14c, that is, the eddy current in the permanent magnet 14a, becomes substantially zero and, furthermore, the reduction of the total magnetic force produced by the permanent magnets 14a–14c inserted in each hole 12 can be limited to a predetermined range.

The permanent magnet 14a located at the leading end of the hole 12 with respect to the rotating direction of the rotor piece 10 is the first magnet of the three to enter the field produced by each stator coil. If plurality of identical permanent magnets were arranged in a direction of the circumference of the rotor, the permanent magnet 14a would experience the greatest eddy currents of all the permanent magnets. Therefore, employment of a ferrite magnet as the permanent magnet 14a effectively reduces eddy currents.

The manner of disposing ferrite magnets is not limited to a manner in which one ferrite magnet is disposed in a hole 12, as long as at least one of the permanent magnets 14 disposed in the rotor is a ferrite magnet. It is not necessary that each hole 12 hold a ferrite magnet.

This embodiment adopts not only a divided arrangement in which divided or smaller permanent magnets are disposed in a hole in the rotor but also a ferrite magnet at the position of the permanent magnet 14a, in which great eddy currents occur. Therefore, the embodiment is able to effectively reduce eddy currents as a whole. Furthermore, since the other permanent magnets 14b, 14c are rare-earth magnets, considerable reductions of the total magnetic force of the permanent magnets 14 can be prevented.

Figure 7:
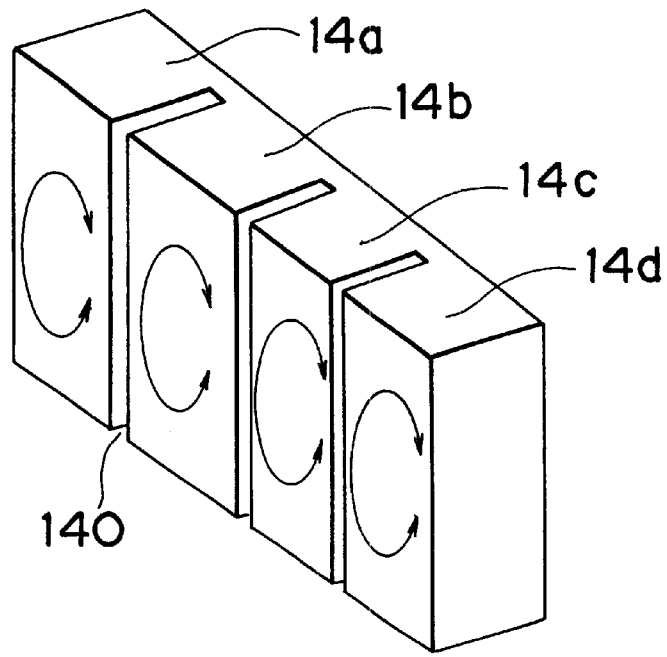
FIG. 7 illustrates a construction according to a fourth embodiment of the invention.
Figure 8:
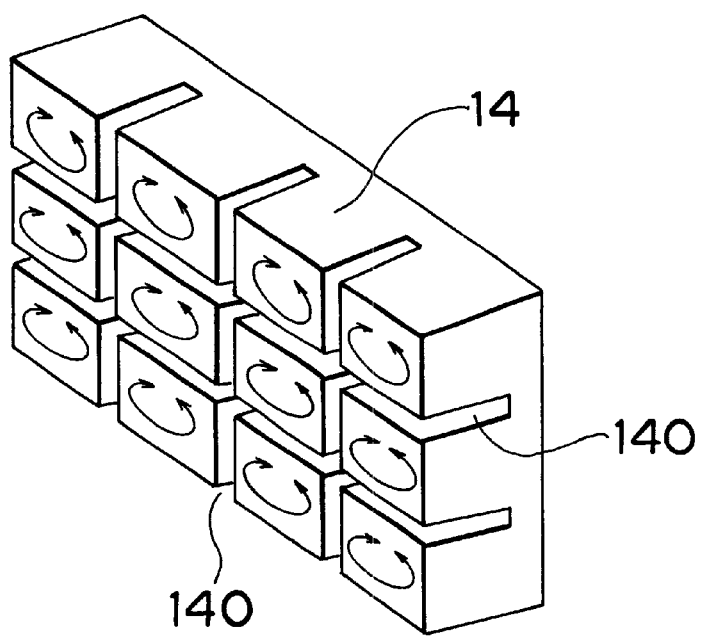
FIG. 8 illustrates another construction according to the fourth embodiment.
Figure 9:
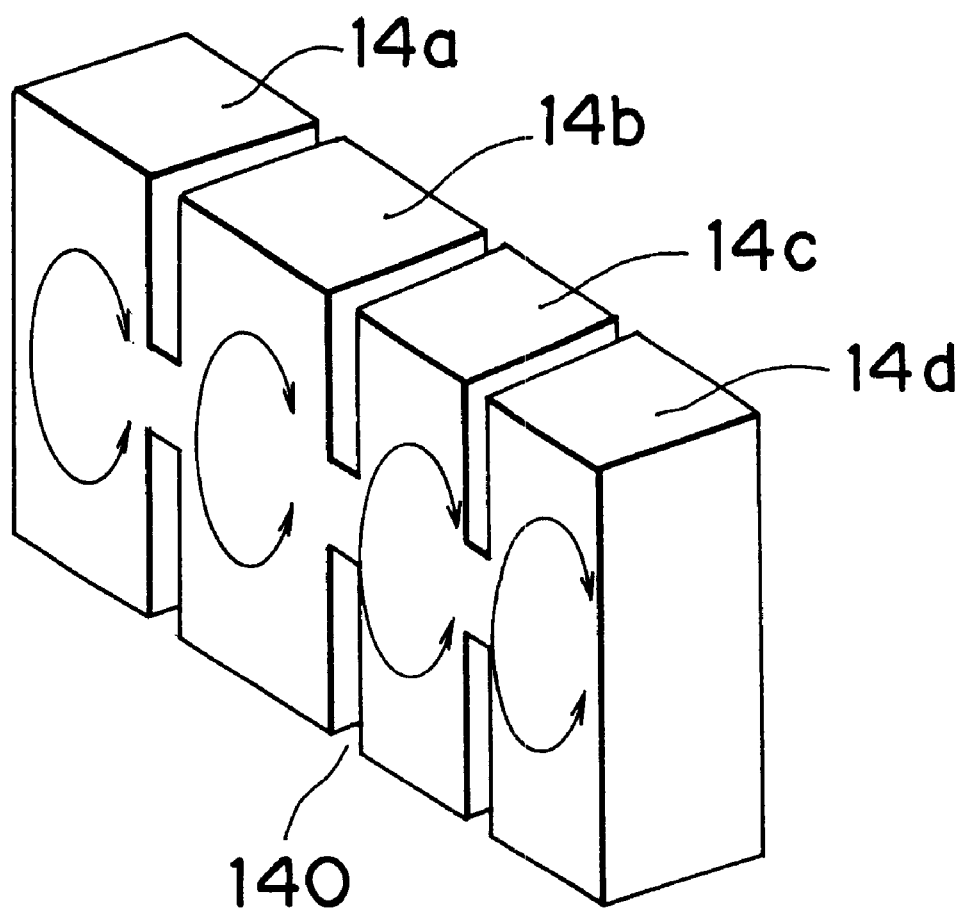
FIG. 9 illustrates still another construction according to the fourth embodiment.

FIGS. 7, 8 and 9 illustrate constructions according to a fourth embodiment of the invention. In this embodiment, a permanent magnet 14 is divided into a plurality of permanent magnet portions that are partially connected to one another. Therefore, although the permanent magnet 14 is substantially divided, the substantially divided magnet portions can be handled as a single magnet during the mounting to the hole 12 or the like. Hence, the productivity can be improved. Furthermore, the connecting portions between the divided portions of the permanent magnet 14 may be sufficiently reduced within a range where a required strength thereof is secured, so that a sufficiently great effect of reducing eddy currents can be maintained.

In the construction shown in FIG. 7, the permanent magnet 14 is divided into four permanent magnet portions 14a, 14b, 14c, 14d by vertical slits 140 extending from an obverse side toward a reverse side of the permanent magnet 14 while the permanent magnet portions 14a–14d are interconnected at the reverse side. It is preferred that the permanent magnet 14 be disposed in a hole 12 in such a posture that the obverse side of the permanent magnet 14 faces the stator.

In the construction shown in FIG. 8, a permanent magnet 14 has vertical slits 140 and horizontal slits 140 that divide the permanent magnet 14 as in a manner of a grid. Therefore, each divided permanent magnet portion further reduces in size, so that eddy currents can be further reduced.

In the construction shown in FIG. 9, a permanent magnet 14 is divided into permanent magnet portions 14a–14d by upper slits 140 extending from an upper end of the permanent magnet 14 into an internal or intermediate portion of the permanent magnet 14 and lower slits 140 extending from a lower end of the permanent magnet 14 into the intermediate portion thereof. Each adjacent pair of the permanent magnet portions 14a–14d are interconnected at central portions of the adjacent side surfaces of the pair of permanent magnet portions.

The configuration of the connecting portions is not limited to those described above, but may be any suitable configuration. For example, the connecting portions interconnecting adjacent permanent magnet portions may have a rod-like shape. The connecting portions may be formed in arbitrary portions of the permanent magnet portions.

Although it is preferable to form the permanent magnets 14 integrally or unitarily, it is also possible to prepare separate permanent magnets 14 and connect them by sticking the permanent magnets to connecting members such as plate members or the like. The connecting members may be formed from an electrically insulating material. If the insulating members are used as spacers, a construction substantially the same as that of the first embodiment can be formed.

In the foregoing embodiments, the divided or smaller permanent magnets 14 are inserted into a hole 12. In the case of a motor employing surface magnets, divided surface magnets may be used.

As is apparent from the foregoing description, a plurality of divided or smaller permanent magnets are disposed in a hole in the invention. Therefore, eddy currents can be reduced, and eddy current loss can be reduced. Furthermore, if divided or smaller permanent magnets are interconnected at portions thereof, the productivity can be improved. Furthermore, if one or more of the divided or smaller permanent magnets are ferrite magnets and the other permanent magnets are rare-earth magnets, the reduction of magnetic force can be minimized and the occurrence of eddy currents can be effectively controlled.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A permanent magnet motor comprising:

a stator;

a rotor rotatably mounted within the stator, the rotor having a plurality of holes formed therein; and a permanent magnet forming a first one of a plurality of poles of the motor, the permanent magnet being disposed by itself in a first one of the holes, the permanent magnet being divided in a direction of a circumference of the rotor into a plurality of permanent magnet segments by at least one slit so that portions of adjacent ones of the permanent magnet segments remain interconnected and aligned in a substantially straight line along the direction in which the permanent magnet is divided, wherein a first pole of the permanent magnet faces in the direction of a radius of the rotor toward the center of the rotor, and a second pole of the permanent magnet faces away from the center of the rotor along said rotor radius.

2. A permanent magnet according to claim 1, wherein the at least one slit extends in at least one of a direction of a circumference of the rotor and a direction of an axis of the rotor.

3. A permanent magnet motor according to claim 2, wherein the permanent magnet is disposed so that a face of the permanent magnet in which the at least one slit is formed faces outward in a direction of a radius of the rotor.

4. A permanent magnet motor according to claim 1, wherein the permanent magnet is disposed so that a face of the permanent magnet in which the at least one slit is formed faces outward in a direction of a radius of the rotor.

* * * * *